Sept. 30, 1969  G. WATSON  3,470,452
REGULATED POWER SUPPLY HAVING A TAPPED LINE TRANSFORMER
FOR PROVIDING A PLURALITY OF DC VOLTAGE LEVELS
Filed March 13, 1968

INVENTOR
Guido Watson

BY *Donald R. Lackey*
ATTORNEY

— # United States Patent Office 3,470,452
Patented Sept. 30, 1969

3,470,452
REGULATED POWER SUPPLY HAVING A TAPPED LINE TRANSFORMER FOR PROVIDING A PLURALITY OF DC VOLTAGE LEVELS
Guido Watson, Murrysville, Pa., assignor to Westinghouse Electric Corporation, Pittsburgh, Pa., a corporation of Pennsylvania
Filed Mar. 13, 1968, Ser. No. 712,677
Int. Cl. H02m 1/08, 7/44
U.S. Cl. 321—18   9 Claims

ABSTRACT OF THE DISCLOSURE

An AC to DC regulated power supply, including input and output terminals, a line transformer having a plurality of taps, rectifier means connected to certain of the transformer taps to provide a plurality of DC voltage levels, a transistor connected between each of the DC voltage levels and the output terminals, and feedback circuitry for providing a signal responsive to the deviation of the voltage at the output terminals from the desired value. The transistors are connected in a cascaded emitter follower arrangement, and provide automatic tap changes on the transformer as the AC voltage at the input terminals changes, to provide power flow through the series transistor associated with the lowest DC voltage level capable of being regulated by the feedback signal to provide the desired voltage at the output terminals.

BACKGROUND OF THE INVENTION

Field of the invention

The invention relates in general of AC to DC voltage regulated power supplies, and more particularly to AC to DC voltage regulated power supplies of the type which utilize feedback means and a series transistor to provide the regulation.

Description of the prior art

Voltage regulated DC power supplies fall into two basic groups or classes, the dissipative and the non-dissipative. The non-dissipative class of regulator may be of the magnetic amplifier type, which controls the AC input to the rectifiers, it may be of the controlled rectifier type, which controls the average DC output voltage through phase angle control, or it may be of the chopper type, wherein the DC output is chopped at a relatively high frequency, to provide the desired average DC output voltage. The magnetic amplifier and controlled rectifier types are relatively slow, with their speed of operation being limited by the line frequency, and both require an additional iron cored component which adversely affects the size and weight of the apparatus. The chopper type has a faster response time, but is complicated by the requirement of utilizing a high frequency filter capable of carrying the load current, and is a source of high frequency radiation which may adversely affect certain types of sensitive apparatus operated in the vicinity of the power supply.

The dissipative class of regulator may be of the shunt type, or of the series type. The shunt type varies the voltage drop across a resistor connected in series with the load, by shunting that amount of current in parallel with the load which is necessary to keep the load voltage constant. The series type utilizes a line transformer feeding a rectifier and filter capacitor assembly, with the DC output being connected to the load through a series transistor. The series transistor is driven by feedback means responsive to the output voltage, to provide a current which will keep the output voltage constant. The series regulator is widely used in those applications where the expected line voltage variation is small, because it is fast acting, both as to line voltage and load current changes, and it has good efficiency at low load currents. Filtering is usually achieved without a filter inductor, requiring only a single energy storage capacitor. The disadvantage of the series regulator is its poor efficiency when the line voltage is high. Further, this poor efficiency presents the additional problem of heat dissipation. AC to DC power supplies with series regulators would find broader application if some means were to increase their efficiency.

SUMMARY OF THE INVENTION

Briefly, the present invention is a new and improved AC to DC power supply of the series regulator type, which has a greatly improved efficiency over series regulators of the prior art. In addition to the line transformer, rectifier and capacitor assembly, and series transistor of the prior art, a second rectifier and capacitor assembly, and a second series transistor are provided, which are associated with a lower voltage tapping of the line transformer. The two series transistors are connected in a cascaded emitter follower arrangement. When the line voltage is below a predetermined magnitude, the power is supplied from the higher voltage tapping on the transformer. When the line voltage rises above this predetermined value, the second series transistor conducts and supplies the power from the lower voltage tapping. Thus, an automatic electronic or static tap change is performed which increases the efficiency of the power supply by a ratio of approximately two to one, when the AC input voltage is at its upper limit.

BRIEF DESCRIPTION OF THE DRAWINGS

Further advantages and uses of the invention will become more apparent when considered in view of the following detailed description and drawings, in which.

DESCRIPTION OF PREFERRED EMBODIMENTS

Figure 1:
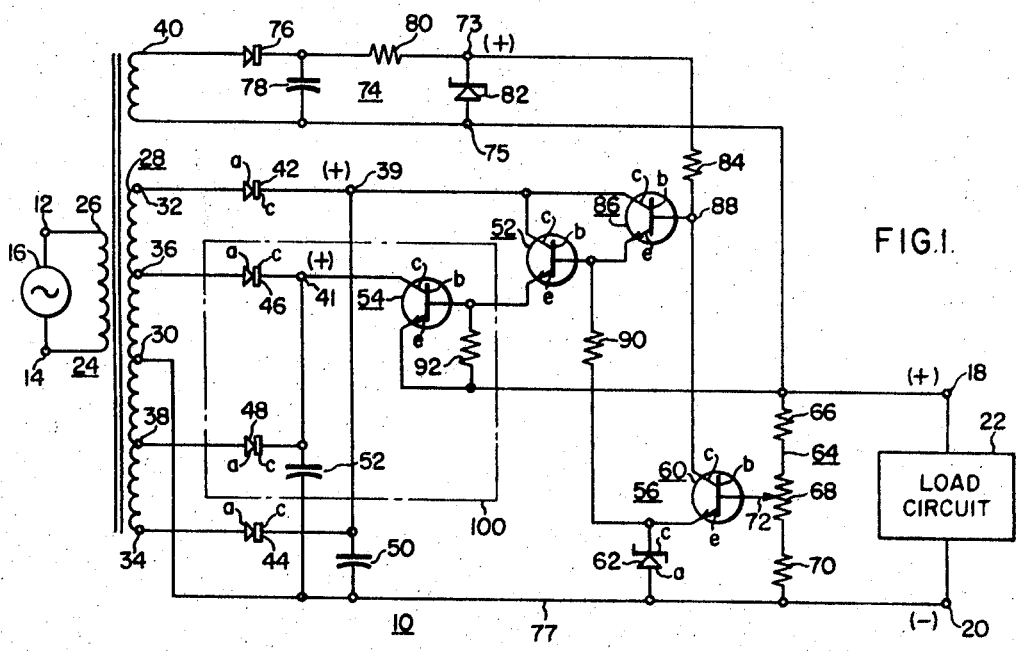
FIG. 1 is a schematic diagram of an AC to DC power supply of the series regulator type, constructed according to the teachings of the invention.

Referring now to the drawings, and FIG. 1 in particular, there is shown an AC to DC power supply 10 of the series regulator type, constructed according to an exemplary form of the invention. Power supply 10 includes input terminals 12 and 14, which are adapted for connection to a source 16 of AC potential, and output terminals 18 and 20 which are adapted for connection to a load circuit 22. A power or line transformer 24 is provided which has a primary winding 26 connected to input terminals 12 and 14, and a secondary winding 28 which has a center tap 30, and a plurality of additional pairs of taps or terminals, with the taps of each pair being disposed in electrical symmetry about the center tap 30. For example, a pair of taps 32 and 34 may be connected to the ends of the secondary winding 28, and a pair of taps 36 and 38 may be disposed at predetermined lower tapping points on the winding. Transformer 24 may also include an auxiliary secondary winding 40 for providing an ancillary voltage for the correct operation of the power supply 10.

First and second DC voltage levels are provided, between terminals 39 and 41 and the center tap 30, respectively, by connecting a first pair of rectifiers or diodes 42 and 44 to the first pair of transformer taps 32 and 34, respectively, and a second pair of rectifiers 46 and 48 to the second pair of transformer taps 36 and 38, respectively. Each of the rectifiers or diodes includes an anode electrode $a$, and a cathode electrode $c$, with the anode electrode $a$ of the rectifiers being connected to its associated tap on the power transformer 24, and with the cathode electrodes $c$ of the first pair of rectifiers being connected in common at terminal 39, and with the cathode electrodes $c$ of the second pair of rectifiers being connected in common at terminal 41. The full-wave rectified first DC voltage level, which appears at terminal 39, is filtered by a filter capacitor 50 which is connected from terminal 39 to center tap 30, and the full-wave rectified second DC voltage level, which is lower in magnitude than the first DC voltage level, and which appears at terminal 41, is filtered by a filter capacitor 52 which is connected from terminal 41 to the center tap 30.

The first DC voltage level, appearing between terminal 39 and center tap 30, is connected to the output terminals 18 and 20 through a first series power transistor 52, which may be of the NPN junction type, having base, collector and emitter electrodes, $b$, $c$ and $e$, respectively.

The second DC voltage level, appearing between terminal 41 and the center tap 30, is connected to the output terminals 18 and 20 through a second series power transistor 54. Transistor 54 is also of the NPN junction type, having base, collector and emitter electrodes, $b$, $c$ and $e$, respectively.

Feedback means 56 is provided which obtains a measure of the voltage at the output terminals 18 and 20, compares it with a reference voltage, and provides an error signal responsive to any deviation between the output voltage and the desired value. Feedback means 56, as illustrated in FIG. 1, may include a differential amplifier transistor 60, which compares the voltage established across a Zener diode 62, with the voltage at a preselected point of a precision voltage divider 64, connected across the output terminals 18 and 20. Specifically, transistor 60 is of the NPN junction type, having base, collector and emitter electrodes $b$, $c$ and $e$, respectively, and voltage divider 64 may include a plurality of serially connected resistors 66, 68 and 70. Resistor 68 may be adjustable, having a movable arm 72 connected to the base electrode $b$ of transistor 60. The voltage output of power supply 10 is set by the position of movable arm 72.

The Zener diode 62, which has anode and cathode electrodes $a$ and $c$, respectively, has its cathode electrode $c$ connected to the emitter electrode $e$ of transistor 60, and its anode electrode $a$ connected to conductor 77, which is connected to the common or center tap connection 30.

The collector electrode $c$ of transistor 60 is connected to the positive terminal 73 of a unidirectional source 74 of voltage, through collector load resistor 84. Source 74 may be conventional, utilizing auxiliary winding 40 of transformer 24, a rectifier or diode 76, a filter including capacitor 78 and a resistor 80, and a voltage regulating or Zener diode 82. Terminal 75 of source 74 may be connected to output terminal 18, or to terminal 20, if a suitable voltage level at terminal 73 is provided.

As the voltage at output terminals 18 and 20 changes, the voltage applied to the base electrode $b$ of transistor 60 will change, relative to the constant voltage across Zener diode 62. Thus, the current flow through the collector-emitter electrodes of transistor 60 will be responsive to the magnitude of the output voltage of power supply 10 relative to the reference or Zener voltage of Zener diode 62. The feedback signal, which is responsive to the change in current flowing through transistor 60, may be amplified by suitable amplifying means, such as transistor 86, before the feedback signal is applied to the series transistors 52 and 54. Transistor 86 is of the NPN junction type, having base, collector and emitter electrodes, $b$, $c$ and $e$, respectively. The base electrode $b$ of transistor 86 is connected to the junction 88 between the collector load resistor 84 and the collector electrode $c$ of transistor 60. The collector electrode $c$ of transistor 86 is connected to the first DC voltage level at terminal 39, and the emitter electrode $e$ of transistor 86 is connected to the base electrode $b$ of transistor 52.

The series transistors 52 and 54 are connected in a cascaded emitter follower arrangement, with the collector electrode $c$ of transistor 52 being connected to terminal 39, which is the positive terminal of the first DC voltage level, and its emitter electrode $e$ being connected to the base of transistor 54. A base return resistor 90 for transistor 52 is connected from its base electrode $b$ to the junction between the emitter electrode $e$ of transistor 60 and the cathode electrode $c$ of Zener diode 62. Thus, Zener diode 62, in addition to being provided with the current flowing through transistor 60, is supplied with the current flow through resistor 90, which is substantially constant.

Transistor 54 has its collector electrode $c$ connected to terminal 41, which is the positive terminal of the second DC voltage level, and its emitter electrode $e$ connected to the output terminal 18. A base return resistor 92 is connected from the emitter electrode $e$ to the base electrode $b$ of transistor 54.

The operation of power supply 10 will first be described according to the prior art construction and operation of DC power supplies of the series regulator type. This may be accomplished by describing the functions of power supply 10 without the components enclosed within the dotted enclosure 100. Resistor 92, in this instance, would be replaced by a solid conductor. The current flow to the load circuit will thus be from taps 28 and 34 of transformer 24, through rectifiers 42 and 44, and through series transistor 52. The current flow through the series transistor is controlled by the feedback means 56 and amplifier 86, to maintain the output voltage across terminals 18 and 20 at the desired magnitude. If the output voltage drops, the voltage applied to the base electrode $b$ of transistor 60 via the voltage divider network 64 will drop. Transistor 60 will draw less line current from source 74, and hence more current will flow into the base electrode $b$ of transistor 86. This increase in the base drive of transistor 86 is amplified, supplying more current to the base electrode $b$ of series transistor 52. Transistor 52, thus, allows more current to flow through the load circuit which opposes the drop in the output voltage at terminals 18 and 20, and brings the output voltage back to its regulated value.

If the output voltage increases at terminals 18 and 20, the voltage applied to the base electrode $b$ of transistor 60, via the voltage divider network 64, will increase. Transistor 60 will thus draw more current from the source 74, and less current will flow into the base electrode $b$ of transistor 86. The decrease in base drive of transistor 86 tends to reduce the current flowing through transistor 54, which opposes the tendency of the output voltage to rise, bringing it back to its regulated value.

The prior art type of AC to DC power supply possesses the disadvantage of having an efficiency which progressively decreases as the AC line input voltage increases towards the high end of its range. The power loss, in percentage of the input power, in an AC to DC power supply designed for an AC input variation of $\pm 15\%$ may be as high as 50% when the input voltage is at the high end of the range. This creates the problem of dissipating the heat generated by this loss in power, which complicates the heat sinks required, especially when the power supply is associated with other heat sensitive apparatus.

This invention reduces the power loss by a ratio of two to one at the high end of the AC input range, and allows the power supply to operate at approximately 95% efficiency when the AC line input voltage is near its nominal or rated value. This improvement is accomplished by providing the components within the dotted enclosure 100, essentially duplicating the rectifiers, capacitor and series transistor of the prior art power supply, but connecting the new rectifiers to a lower voltage tapping of the line transformer 24.

The point at which taps 36 and 38 are disposed is determined by the requirements of the particular power supply, as will be hereinafter explained. For the moment, it is sufficient to note that the tapping point selected will provide a voltage at terminal 41, and thus to the collector electrode c of series transistor 54, which is less than the regulated output voltage of the power supply, over a predetermined portion of the lower AC input voltage range. Power supply 10 will operate as hereinbefore explained relative to the prior art power supply, with the power being supplied from taps 32 and 34 of transformer 24, and from the first DC voltage level appearing across terminal 39 and center tap 30, while the AC input voltage is in a predetermined portion of its lower range. The only difference being that transistor 54 will act as a forward biased diode, allowing the load current which is flowing through transistor 52 to flow through the base-emitter junction of transistor 54, with negligible voltage drop. The collector electrode c, and thus terminal 41 will rise to substantially the output voltage appearing at the output terminals due to the diode action of transistor 54, reverse biasing rectifiers 46 and 48.

When the AC input voltage reaches the magnitude where the rectified value of the voltage appearing at taps 36 and 38 of transformer 24 exceeds the output voltage of the power supply 10, transistor 54 will conduct in the conventional manner. When this occurs, transistor 52 will become merely an emitter follower amplifier, driving transistor 54. The collector current of transistor 52 will, therefore, drop to a small fraction of its previous value, and substantially all of the load current will now be provided by the lower voltage tapping on the transformer 24. The circuit, in effect, performs an automatic electronic tap change, and since the power is being supplied by the lower voltage taps 36 and 38, i.e., from the second DC voltage level, the amount of power wasted will be decreased, increasing the efficiency of the power supply 10. When the AC input voltage drops to the point where series transistor 54 will no longer conduct, the power will be provided by taps 32 and 34, providing an automatic electronic tap change to those taps which are capable of providing the regulated output voltage of the power supply 10.

Figure 2:
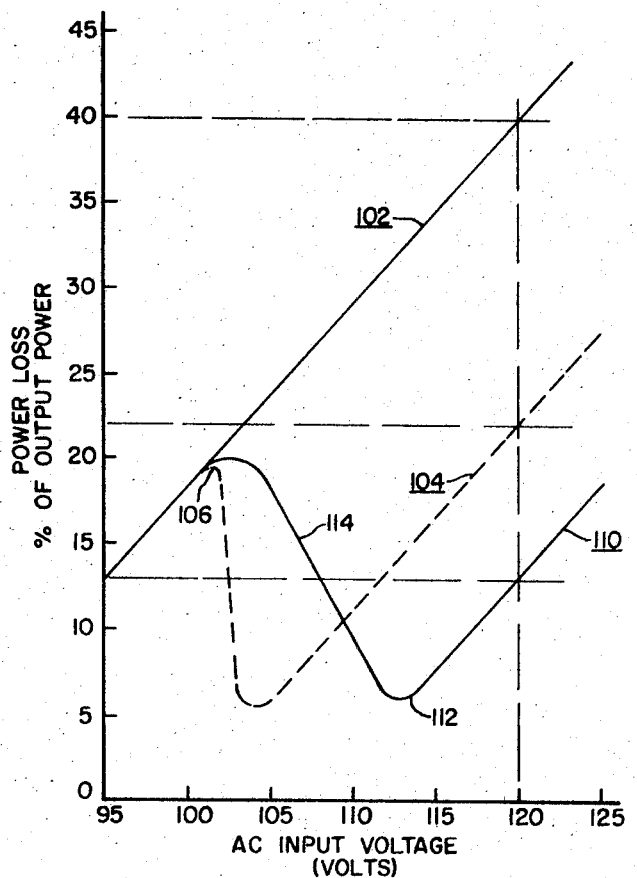
FIG. 2 is a graph which compares the efficiency of an AC to DC regulated power supply constructed according to the teachings of the prior art, with the efficiencies of two similarly rated AC to DC power supplies constructed according to the teachings of the invention.

FIGURE 2 is a graph which compares the power loss in percentage of the output power, versus the AC input voltage, for AC to DC power supplies constructed according to the teachings of the prior art, and according to the teachings of the invention. Curve 102 represents the power loss curve for a typical prior art AC to DC power supply having a series transistor regulator. It will be noted that the loss curve 102 for the prior art power supply is a straight line, with the power loss increasing at a linear rate as the AC input voltage is increased.

Curve 104 represents the power loss curve of a power supply constructed according to the teachings of the invention. The power loss curve 104 follows the power loss curve 102 of the prior art power supply, until point 106 is reached, at which time the second series transistor becomes conductive, and the power loss almost immediately drops to a value which is approximately 5% of the ouput power. The power loss on this new lower voltage tapping point then starts to increase along the same slope as the curve 102 for the prior art power supply.

In order to obtain the sharp drop in power loss when the second series transistor becomes conductive at point 106, large filter capacitors are necessary, together with a power transformer 24 of good regulation. This is due to the fact that there is a finite value of ripple voltage on each of the first and second DC voltage levels, which results in a dynamic switching from one series transistor to the other during each half cycle, over a certain range of AC input voltage. The less ripple, the sharper the drop in the loss of output power, as the dynamic switching occurs over a more narrow range of AC input voltage. However, instead of being detrimental, this dynamic switching may be utilized to provide several important advantages, and these advantages are obtained by using smaller filter capacitors, and a power transformer having relatively poor regulation. Thus, the advantages are obtained while reducing the size, weight and cost of the power supply.

More specifically, since in most applications, the AC input voltage will be close to the nominal or rated value, it would be desirable to provide good efficiency over a fairly broad range of AC input voltage, with the nominal voltage falling substantially in the middle of this range. If the power loss curve is sharp, such as curve 104, the high efficiency is achieved only in a very narrow range of AC input voltage. By extending the dynamic switching range of the transistors during each ripple half cycle, such as shown in curve 110, the apparatus may be designed such that the apex 112 of the curve 110 occurs at the nominal input voltage, and the power loss on each side of the apex does not increase as rapidly, thus maintaining good efficiency for a substantial range on each side of the nominal AC input voltage. Portion 114 of curve 110 illustrates how this dynamic switching of the transistor may be expanded over a fairly broad range of AC input voltage. This has another advantage, as the power loss curve starts to increase later in the AC input voltage range, which reduces the power losses at the high end of the AC input voltage range. In the particular embodiment of the invention illustrated in the curves of FIG. 2, the nominal input voltage was 115 volts, with the efficiency approaching 95% at this nominal voltage, when the power supply is constructed to provide a broad dynamic switching range. If the power supply is constructed to have a narrow dynamic switching range, and if it is designed to start switching the second series transistor at the same point in the AC input voltage range as the power supply for curve 110, it will reach its peak efficiency too soon. If it is designed to reach its peak efficiency at the nominal AC input voltage, it will have to follow the power loss curve 102 of the prior art over a broader range of the AC input voltage. Instead of starting to reduce its power loss at the 20% point, it may have to follow the prior art curve until reaching the 25 to 30% point. To illustrate the disadvantage of having a sharp drop in power loss, i.e., a narrow dynamic range, especially at the high end of the AC input range, an AC input voltage of 120 volts was selected. The power loss using a power supply having the characteristic of curve 110 is approximately 13%, the power loss using a power supply having the characteristic of curve 104 is approximately 22%, and the power loss using a power supply having the characteristic of curve 102 is approximately 40%. Thus, the use of relatively small filter capacitors 50 and 52, and the use of a transformer 24 which has relatively poor regulation, is beneficial to the performance of the power supply, actually improving its operation by providing a wider band of relatively high efficiency around the nominal AC input voltage, and by reducing the power loss at the high end of the AC input voltage range.

It is important to reduce or nullify the gain increase potentially available when the second series transistor 54 becomes operative, in order to provide a power supply which has good high frequency stability. This may be accomplished by selecting the value of resistor 84 such that its resistance is low compared with the effective input impedance at the base of transistor 86. This will insure that transistors 52 and 54 are driven from essentially a voltage source, which will nullify the potential increase in gain of the cascade connected emitter follower arrangement when transistor 54 becomes conductive.

If the voltage drop of the base-emitter junction of transistor 54 exceeds approximately one volt while it is carrying the load current from transistor 52, a pair of diodes may be serially connected across the base-emitter electrodes of transistor 54, which will conduct in the event the voltage drop across the base-emitter junction reaches the sum of their threshrold voltages. This will prevent the diode action of transistor 54 from adversely affecting the efficiency of the power supply, in the event the transistor selected for transistor 54 has an excessive base-emitter voltage drop.

While power supply 10 has been described using only two levels of DC voltage, and two series power transistors, it will be appreciated that any number of DC voltage levels and series power transistors may be utilized, to provide a plurality of automatic electronic tap changes as the AC input voltage varies across its range. Further, while a full-wave rectification of the transformer voltage is desirable, it will be understood that half-wave rectification may also be used to obtain the benefits of the teachings disclosed herein. Still further, the line or power transformer 24, instead of being of the isolated winding type, may also be of the autotransformer type. The teachings of the invention may also be extended to polyphase circuits, by following the basic teachings disclosed relative to the single-phase AC power supply hereinbefore described.

In summary, there has been disclosed a new and improved AC to DC power suply of the series regulator type which automatically performs electronic, solid state tap changes on the line or power transformer, to effectively operate the series regulator from the lowest AC voltage tapping which will provide the desired regulated DC output voltage. This has the advantages of substantially reducing the power loss in the regulator over the AC input voltage range, it reduces the amount of heat generated, which results in a direct economy in the heat sink requirements, the power supply may be designed to reach its maximum efficiency at rated or nominal line input voltage, and it obtains these advantages without deleteriously affecting the excellent stability and response of the conventional series regulated power supply. Further, the changes required in the conventional series regulated power supply to practice the teachings of the invention are not complciated, requiring the addition of only a few low cost components.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

I claim as my invention:

1. An AC to DC regulated power supply, comprising: input terminals adapted for connection to a source of AC potential,
output terminals adapted for connection to a DC load, transformer means connected to said input terminals and having a plurality of taps thereon,
rectifier means connected to certain of the taps on said transformer means,
means connecting said rectifier means to provide at least first and second different DC voltages levels,
at least first and second transistors each having collector, emitter and base electrodes, said at least first and second transistors being connected in a cascaded emitter follower arrangement,
means connecting said at least first and second DC voltage levels to said output terminals through the collector-emitter electrodes of said at least first and second transistors, respectively,
and feedback means connected to said output terminals and to the input of said at least first and second cascade connected transistors, applying a feedback signal to said transistors responsive to the deviation of the voltage at said output terminals from the desired value.

2. The AC to DC power supply of claim 1 wherein said transformer means includes primary and secondary windings, with the primary winding being connected to said input terminals, and with the secondary winding having the plurality of tap connections thereon.

3. The AC to DC power supply of claim 1 wherein the first DC voltage level is greater than the second DC voltage level, the output of the first emitter follower connected transistor is connected to the input of the second emitter follower connected transistor, and the feedback signal from said feedback means is applied to the input of the first emitter follower connected transistor.

4. The AC to DC power supply of claim 1 wherein said rectifier means provides full-wave rectified first and second DC voltage levels.

5. The AC to DC power supply of claim 1 wherein said feedback means includes amplifier means connected to the input of said cascade connected first and second transistors, error detector means, and a DC voltage source driving said amplifier means in response to said error detector means, the input impedance of said amplifier means being high compared to the impedance of said voltage source.

6. The AC to DC power supply of claim 5 wherein said voltage source includes an auxiliary winding on said transformer means, means rectifying the output voltage of said auxiliary winding, and resistance means, the value of said resistance means being low relative to the input impedance of said amplifier means.

7. The AC to DC power supply of claim 1 wherein the taps on said transformer means are selected relative to the desired value of regulated DC output voltage and to the range of AC input voltage, to provide an effective tap change on said transformer means at a predetermined value of AC input voltage at said input terminals.

8. The AC to DC power supply of claim 7 wherein said means connecting said rectifier means to provide said first and second DC voltage levels includes filter capacitor means, with the values of said filter capacitor means and the regulation of said transformer means being selected to provide an effective switching of taps on said transformer means to occur during each cycle of the ripple on said second DC voltage level over a predetermined range of AC input voltage, with the transformer operating without a tap change below and above this predetermined range.

9. An AC to DC regulated power supply comprising:
input terminals adapted for connection to a source of AC potential,
output terminals adapted for connection to a DC load,
an electrical transformer having a primary winding connected to said input terminals, and a secondary winding having a plurality of taps,
rectifier means connected to certain of the taps on said transformer, providing at least first and second direct current voltage levels,
a plurality of transistors each having collector, emitter and base electrodes, said plurality of transistors being connected in a cascaded emitter follower configuration, connecting each DC voltage level to said output terminals through the collector-emitter electrodes of one of said transistors,
and feedback means connected in circuit relation with said output terminals and said cascaded transistors, applying a signal to said cascaded transistors responsive to the deviation of the output voltage from the desired value,
said plurality of cascaded transistors being responsive to the magnitude of said at least first and second DC voltage levels, effectively connecting the lowest DC voltage level to said output terminals which is capable of providing the desired DC output voltage,
the signal from said feedback means controlling the current flow through said cascaded transistors, to adjust the magnitude of the selected DC output level to the desired value.

(References on following page)

References Cited

UNITED STATES PATENTS

| | | | |
|---|---|---|---|
| 2,959,726 | 11/1960 | Jensen | 321—18 |
| 3,049,658 | 8/1962 | Krsna. | |
| 3,195,036 | 7/1965 | McNulty et al. | 321—16 |
| 3,275,929 | 9/1966 | Schatz | 323—43.5 |
| 3,281,652 | 10/1966 | Perrins | 323—19 |
| 3,356,928 | 12/1967 | Parrish | 321—18 |
| 3,384,803 | 5/1968 | Hardin et al. | 323—43.5 XR |

JOHN F. COUCH, Primary Examiner

W. M. SHOOP, Jr., Assistant Examiner

U.S. Cl. X.R.

323—22, 43.5